(12) United States Patent
Lohmiller (10) Patent No.: US 10,238,096 B2
(45) Date of Patent: Mar. 26, 2019

(54) MULTI-FUNCTIONAL ANGLER TOOL

(71) Applicant: Dan Lohmiller, Bozeman, MT (US)

(72) Inventor: Dan Lohmiller, Bozeman, MT (US)

(73) Assignee: Tousands and Tousands, LLC, Bozeman, MT (US)

(*) Notice: Subject to any disclaimer, the term of this patent is extended or adjusted under 35 U.S.C. 154(b) by 100 days.

(21) Appl. No.: 15/391,670

(22) Filed: Dec. 27, 2016

(65) Prior Publication Data

US 2018/0177173 A1      Jun. 28, 2018

(51) Int. Cl.
| | |
|---|---|
| *A01K 83/00* | (2006.01) |
| *A01K 91/04* | (2006.01) |
| *A01K 95/02* | (2006.01) |
| *B26B 11/00* | (2006.01) |

(52) U.S. Cl.
CPC .............. *A01K 95/02* (2013.01); *A01K 83/00* (2013.01); *A01K 91/04* (2013.01); *B26B 11/00* (2013.01)

(58) Field of Classification Search
CPC ........ A01K 95/02; A01K 83/00; A01K 91/04; B26B 11/00
USPC ............................................................ 7/106
See application file for complete search history.

(56) References Cited

U.S. PATENT DOCUMENTS

| | | | | | |
|---|---|---|---|---|---|
| 5,136,744 | A | * | 8/1992 | Allsop | A01K 97/00 407/29.15 |
| 5,207,014 | A | * | 5/1993 | Paneila | A01K 97/00 43/4 |
| 5,383,695 | A | * | 1/1995 | Couper | A01K 91/04 289/17 |
| 7,793,459 | B1 | * | 9/2010 | Ruzicka | A01K 91/04 43/42.49 |
| 2018/0192626 | A1 | * | 7/2018 | Jaramus | B25F 1/003 |

* cited by examiner

*Primary Examiner* — Hadi Shakeri
(74) *Attorney, Agent, or Firm* — Husch Blackwell LLP (57) ABSTRACT

A multifunctional tool for use by anglers is provided. The tool can include a pair of arms positioned in an overlapping fashion and connected together at one end by a coupling pin in order to form a hinged connection allowing the opposing free ends to open and close. The tool can include a cutting blade at the free end to allow users to cut a fishing line by pressing the arms together. The tool can also include a pin pocket with a pin extending therethrough to allow users to clear the eye of a fishing hook. The tool can also include a pair of crimping pockets to allow users to crimp a lead shot onto a fishing line by pressing the tool arms together. The tool can also include a guide channel to allow users to easily thread a fishing line through the eye of a hook.

14 Claims, 6 Drawing Sheets

MULTI-FUNCTIONAL ANGLER TOOL

CROSS-REFERENCE TO RELATED APPLICATIONS

None.

FIELD OF THE INVENTION

The present invention relates generally to a tools used by anglers for equipment maintenance.

BACKGROUND OF THE INVENTION

Anglers often times need to perform equipment maintenance while out fishing in difficult field conditions, such as standing in a stream, on a river bank, in a boat, etc. Such maintenance can include cutting a fishing line, replacing tackle or a hook, attaching a weight or lead shot to the fishing line, clearing debris from the eye of a hook and other maintenance tasks. Currently, different tools exist for performing each one of these tasks. For example, tools, such as clippers, are known for allowing an angler to cut the fishing line. Other specific tools also exist for allowing the angler to clear debris from the eye of a hook or crimp a lead shot. However, requiring an angler to carry multiple tools for performing each of these tasks can take up unnecessary space and can be inconvenient and difficult to handle while fishing. Therefore, it is desirable for anglers to have a single, compact, multifunctioning tool that can allow anglers to easily and conveniently perform the various tasks required with changing tackle and hooks and the like while out fishing. Accordingly, a need exists for an compact angler tool configured for multiple functions, including a fishing line cutting function, a hook eye clearing function and a hook eye threading function.

BRIEF SUMMARY OF THE INVENTION

The present invention is directed toward a multifunctional tool for anglers and the like. The tool can comprise a pair of opposing arms hingedly connected at one end so that the opposing free ends can be opened and closed in a clam-type fashion. One of the free ends can include a cutting blade attached thereto for cutting a fishing line. In order to cut a fishing line, the line can be positioned between the opposing free ends of the tool and the user can press the free ends together, thereby causing the cutting blade to cut the line.

In order to facilitate the opening and closing of the tool, the tool can be configured with a pair of opposing magnets positioned on each arm adjacent to the hinged end of the tool. The opposing magnets can be inset into each arm and can be configured with opposite polarities so as to provide a repelling force urging the free ends of the arms to remain spread apart. In order to close the free ends, a user can overcome the repelling force of the magnets by pressing the arms together. In an alternative embodiment, the hinged connection can include a torsional spring that urges the arms into its open position.

The tool can additionally include a pin pocket defined into the exterior side of one of the arms and configured to be used as a hook eye cleaning device. Positioned within the pin pocket can be a pin or needle extending therethrough. When a user desires to clear the eye of a fishing hook that has been clogged by debris, the user can slide the eye of the hook into the pin pocket and around the pin located therein until the debris is removed.

The tool can additionally include a pair of crimping pockets defined into the interior sides of the tool arms and configured for allowing a user to crimp a lead shot onto a fishing line. The crimping pockets can have a rounded/oval shape that generally conforms to the shape of a lead shot so that when a user presses the arms of the tool together with a lead shot inserted between the crimping pockets, the arms compress the lead shot onto the fishing line without flattening the shot.

The tool can additionally include a fishing line guide channel defined into an exterior side of one of the arms and configured for assisting a user in threading a fishing line through the eye of a fishing hook. The channel can be configured as an elongated groove defined into the exterior side of the tool arm and can include a hook alignment slot intermediately positioned along the groove. The hook alignment slot can be slightly wider than the groove and can enable the user to insert the hook eye perpendicular to the groove so that the opening running through the hook eye aligns with the groove. In order to assist with holding the hook eye in the alignment slot, an inset magnet can be positioned on the underside of the arm and polarized to attract and hold the hook eye into the hook alignment slot. A user can use the guide channel by inserting the eye of a fishing hook into the alignment slot and then threading a fishing line along the guide channel until the fishing line passes through the eye of the hook.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed toward a multifunction tool 10 for use by anglers, fishers and the like. Tool 10 can include a plurality of components configured for assisting users in cutting fishing line, threading a fishing hook, clearing the eye of a blocked fishing hook, crimping lead shots and several other functions. It is also recognized that tool 10 can be used in any number of alternative applications apart from angling and fishing in alternative embodiments of the present invention.

Figure 1:
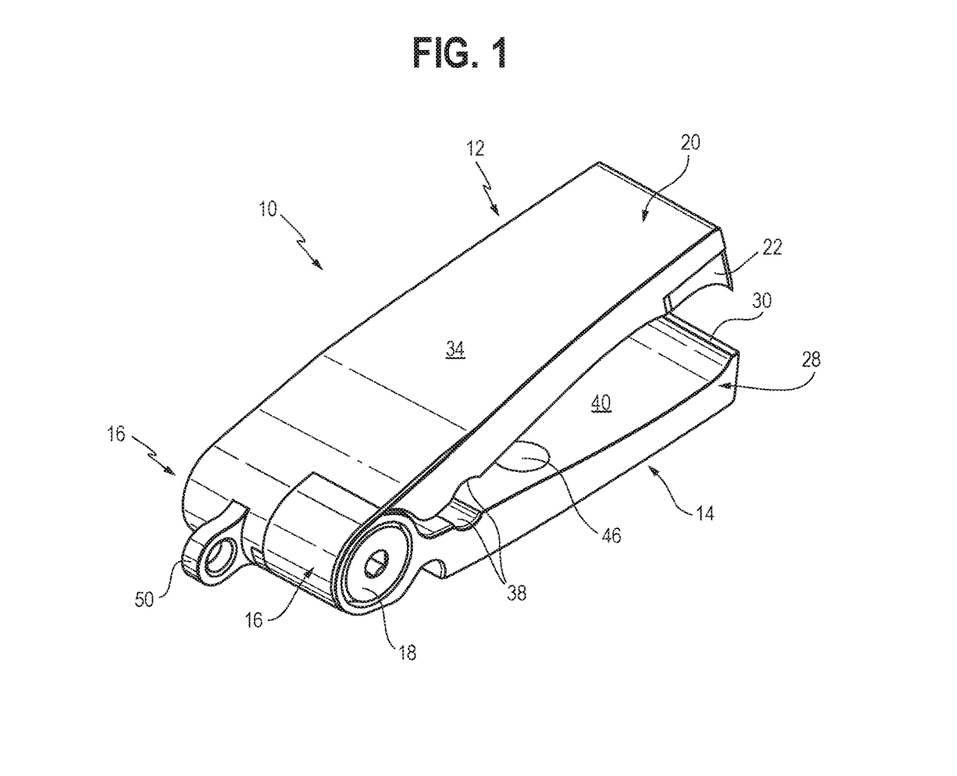
FIG. 1 is a top perspective view of a multifunctional angler tool in accordance with one embodiment of the present invention.
Figure 2:
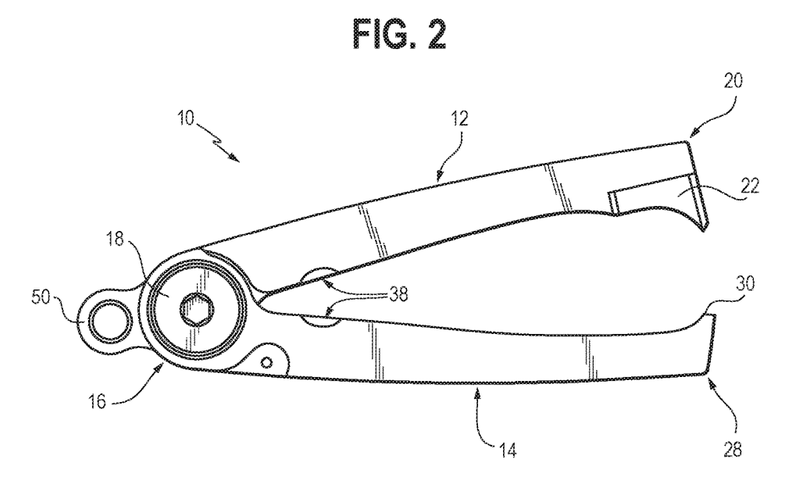
FIG. 2 is a side elevation view of the multifunctional angler tool of FIG. 1.

Turning to the figures, tool 10 can comprise a first arm 12 and a second arm 14, each connected together along their respective base ends 16. As best shown in FIGS. 1 and 2, arms 12 and 14 can be rotatably coupled together at their base ends 16 by means of a coupling or hinge pin 18, which can allow arms 12 and 14 to pivot about base ends 16 relative to one another. According to one embodiment, each base end 16 extends approximately one-half the width of the arm 12 or 14, which can allow base ends 16 to be placed together with arms 12 and 14 in an overlapping configuration. Coupling pin 18 can then be inserted through a common opening defined through base ends 16 of each arm 12 and 14 to connect arms 12 and 14 together. It is also recognized that other coupling configurations can be utilized in alternative embodiments.

Figure 4A:
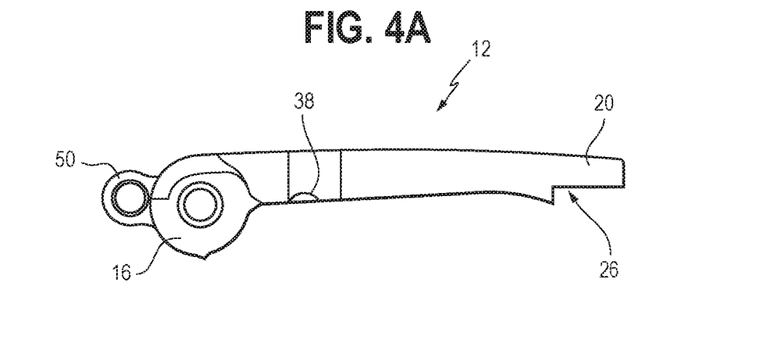
FIG. 4A is a partial side elevation view of multifunctional angler tool of FIG. 1 illustrating a first arm of the multifunctional angler tool.
Figure 4B:
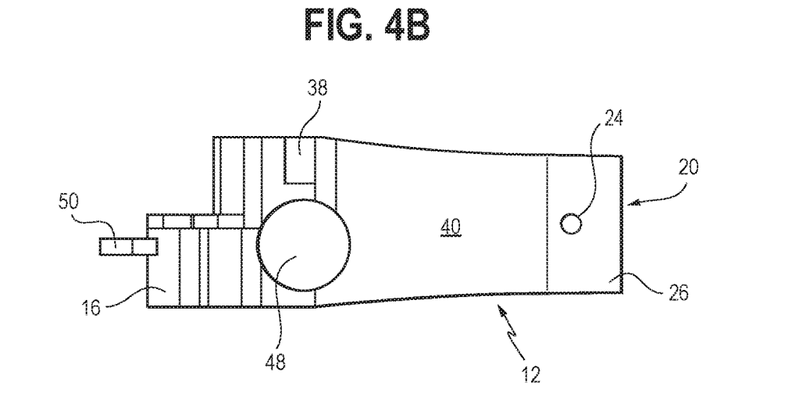
FIG. 4B is a plan view of the first arm of FIG. 4A illustrating an interior side of the first arm.
Figure 4C:
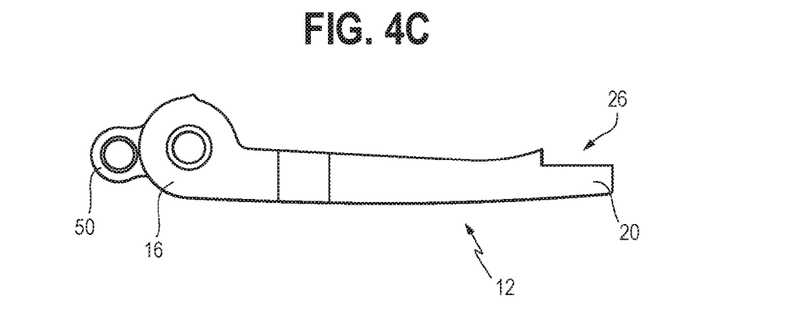
FIG. 4C is a side elevation view of the first arm of FIG. 4A.

As also shown in FIGS. 1 and 2, first arm 12 can include a free end 20 having line cutter blade 22 extending therefrom. Blade 22 can be removably connected to free end 20 by means of a set screw 24, which can allow blade 22 to be replaced or more easily sharpened after prolonged use. In order to facilitate proper positioning of blade 22 after removal, and to prevent blade 22 from shifting while connected to first arm 12, free end 20 of first arm 12 can include a recessed groove 26 (as best shown in FIGS. 4A-4C) for housing blade 22. As shown, recessed groove 26 can be configured to generally conform to the base of blade 22 so that blade 22 can be properly aligned and fixed once set screw 24 is in place. It is also recognized that cutting blade 22 can be fixedly attached to free end 20 or an integral part extending therefrom in other embodiments of the present invention.

Figure 5A:
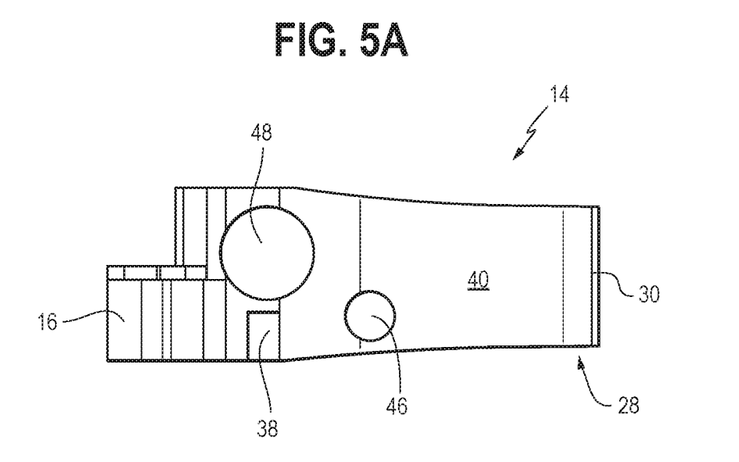
FIG. 5A is a partial plan view of the multifunctional angler tool of FIG. 1 illustrating a second arm of the multifunctional angler tool.
Figure 5B:
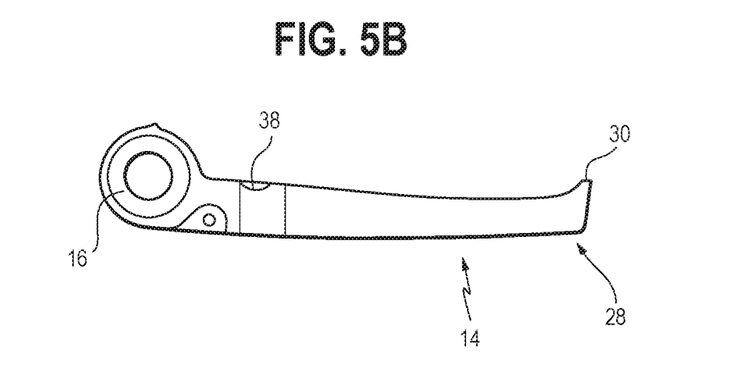
FIG. 5B is a side elevation view of the second arm of FIG. 5A.
Figure 6:
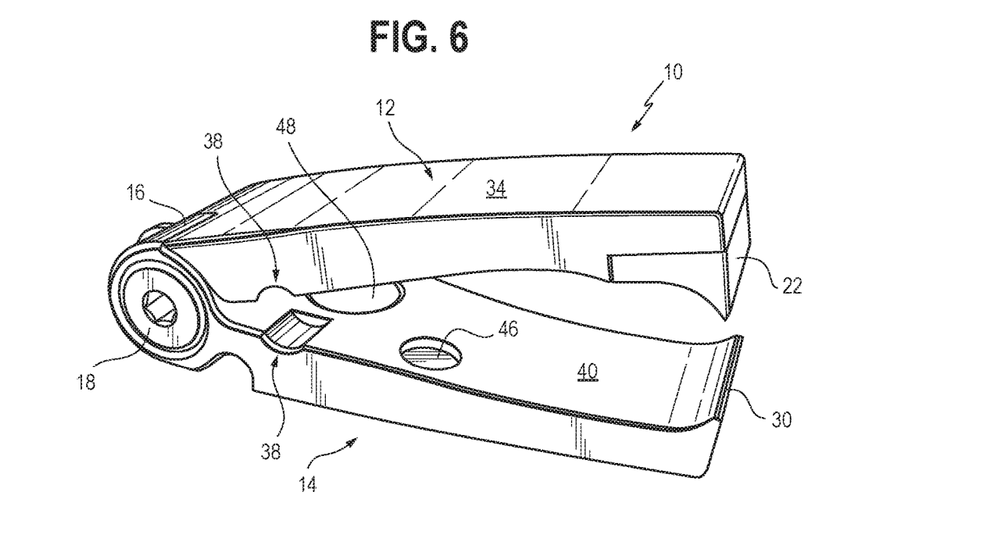
FIG. 6 is a perspective view of a multifunctional angler tool in accordance with one embodiment of the present invention.
Figure 7:
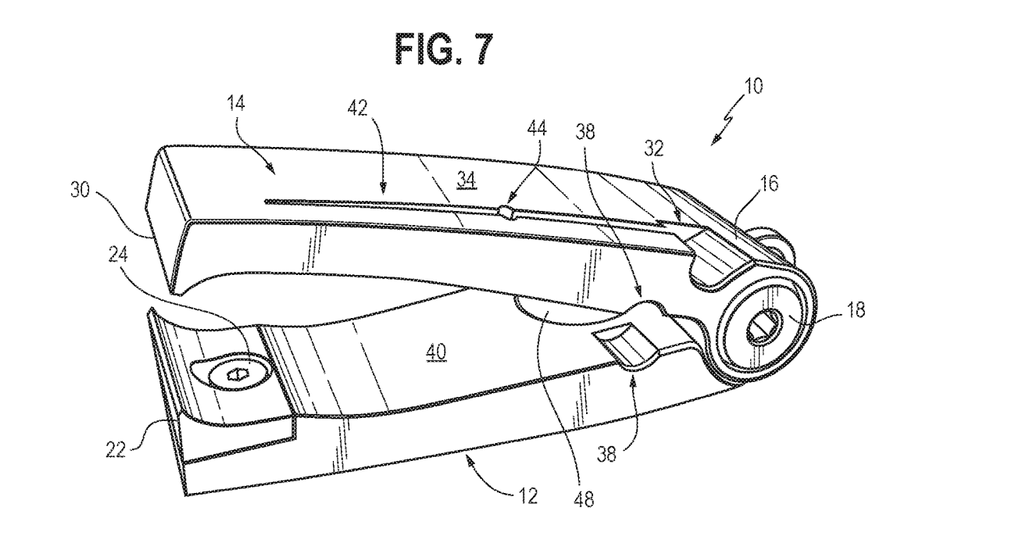
FIG. 7 is a perspective view of the multifunctional angler tool of FIG. 6.
Figure 9:
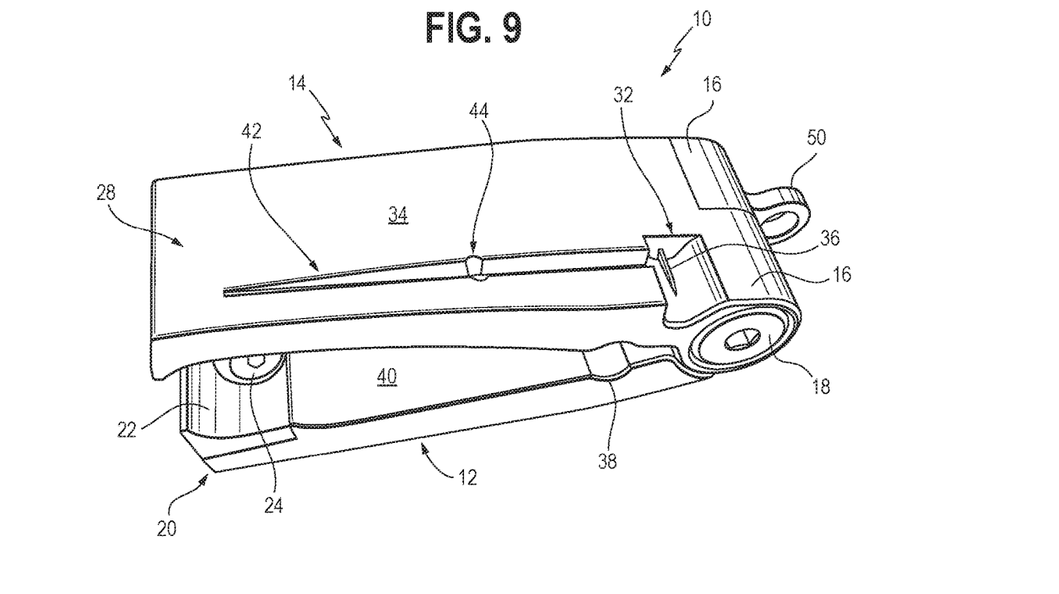
FIG. 9 is a top perspective view of multifunctional angler tool of FIG. 6.

As further shown in FIGS. 1 and 2 and also in FIGS. 5A and 5B, second arm 14 can include a free end 28 having a ridge or curved edge 30 configured to generally align with the edge of blade 22 to facilitate the cutting of fishing line by blade 22. When first and second arms 12 and 14 are pressed together at their respective free ends 20 and 28, the edge of blade 22 can contact ridge 30 in order to provide a cutting plane for cutting fishing line or other items. It is also recognized that free end 28 can be suitably configured without ridge 30 in certain embodiments. FIGS. 6, 7 and 9 further illustrate the configuration of free ends 20 and 28.

Figure 3:
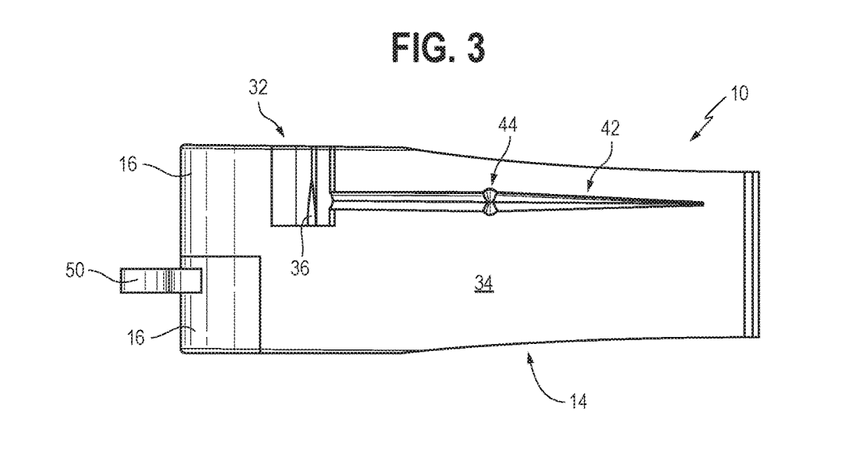
FIG. 3 is a top plan view of the multifunctional angler tool of FIG. 1.
Figure 8:
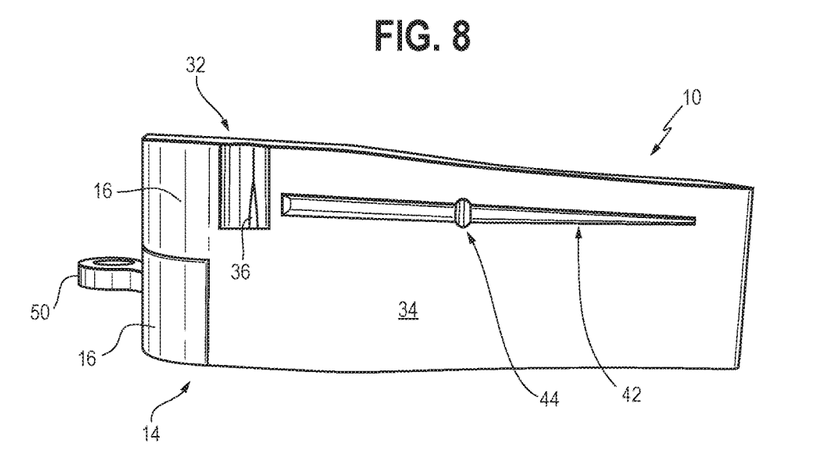
FIG. 8 is a top view of the multifunctional angler tool of FIG. 6.

Turning now to FIG. 3, tool 10 can also include a small pin pocket 32 defined into an exterior side 34 of either first arm or second arm 12 or 14. Pin pocket 32 can be shaped as a recessed groove or machined void defined into exterior side 34 and extending from an edge of exterior side 34 and partially into first or second arm 12 or 14. As illustrated in FIG. 3 (and also FIGS. 8 and 9), pin pocket 32 can house a recessed needle pin 36 configured for allowing a user to clear the eye of a hook from any debris that may prevent or obstruct the hook from being threaded. As illustrated, the base of pin 36 can be inset from exterior side 34 where it defines the boundary of pin pocket 32. Pin 36 can be inset from the edge of arm 12 or 14 and pin pocket 32 can be sized so that the eye of a hook can be slid into the pocket 32 but still prevent a user's fingers from contacting pin 36 located therein for purposes of preventing accidental injury. According to this configuration, the needle pin 36 does not extend to the edge of arm 12 or 14, but rather only partially along the length of pin pocket 32. This can allow the user to insert the hook eye into pin pocket 32 and then push the opening of the hook eye around needle pin 36 while also preventing the user's fingers from contacting needle pin 36. Such a configuration can also prevent needle pin 36 from catching on clothing, fabric or other items while tool 10 is not in use.

Turning again to FIGS. 1 and 2, tool 10 can also include a pair of crimping pockets 38 defined into an interior side of 40 of first and second arms 12 and 14. Crimping pockets 38 can be generally aligned along first and second arms 12 and 14 and can be configured for crimping a lead shot onto a fishing line without flattening the shot. Crimping pockets 38 can be machined into arms 12 and 14 with a generally rounded/oval shape and can extend inward from the outer edge of arms 12 and 14 and partially into interior side 40. As shown, crimping pockets 38 can be positioned near base ends 16 of first and second arms 12 and 14 so that when first and second arms 12 and 14 are pressed together at their respective free ends 20 and 28, crimping pockets 38 come together to form a generally enclosed pocket suitable to crimp the lead shot onto a fishing line. Crimping pockets 38 are further shown in FIGS. 6-7.

Turning again to FIG. 3, tool 10 can also include a fishing line guide channel 42 defined into exterior side 34 of first or second arm 12 or 14. Guide channel 42 can extend generally parallel with the length of arm 12 or 14 (in the longitudinal direction) and can be sized to allow a fishing line to be inserted into the channel 42 and slid along the length of the channel 42. As shown in FIG. 3, near the center of guide channel 42 can be a hook alignment slot 44 configured for receiving the eye of a hook. Guide channel 42 and alignment slot 44 can be configured so that a user can insert the eye of a hook into alignment slot 44 with the opening of the hook eye generally perpendicular to the direction of guide channel 42. The configuration of guide channel 42 in relation to the perpendicular alignment slot 44 can allow the opening passing through the hook eye to be generally aligned with the travel path created by guide channel 42. As a result, the user can slide a fishing line into guide channel 42 and along the length of guide channel 42 until the fishing line slides through the opening running through the hook eye.

In order to assist in maintaining a vertically-orientated position of the hook eye once inserted into alignment slot 44, the interior side 40 of arm 12 or 14 can have a recessed magnet 46 defined therein proximal at a position directly opposing alignment slot 44 as best illustrated in corresponding FIGS. 6 and 7. Magnet 46 can provide an attractive magnetic force through arm 12 or 14 to alignment slot 44 to help hold the hook eye in a vertical position generally perpendicular to guide channel 42 so that a fishing line can be easily slid (or threaded) through guide channel 42 and through the opening of the hook eye positioned within alignment channel 44. Guide channel 42 and alignment slot 44 are further illustrated in FIGS. 7-9.

Turning now to FIGS. 4A-4C and 5A-5B, tool 10 can include a pair of magnets 48 defined into the interior side 40 of first and second arms 12 and 14. As shown, each magnet 48 can be recessed into first and second arms 12 and 14 near their base ends 16 and be generally positionally aligned with one another so that when first and second arms 12 and 14 are connected together at base ends 16, first and second magnets 48 generally oppose each other along the interior sides 40 of first and second arms 12 and 14. The pair of magnets 48 can be orientated with opposing polarities so that they can provide spring tension by urging first and second arms 12 and 14 apart. As a result, the user must press the free ends 20 and 28 of first and second arms 12 and 14 together to overcome the opposing magnetic forces for magnets 48 to move tool 10 from and open position where first and second arms are spread apart to a closed position where first and second arms 12 and 14 are pressed together and blade 22 contacts ridge 30. In alternative embodiments of the present invention, base ends 16 can include a housing having a torsional biasing spring positioned therein for providing the spring tension of tool 10. The positioning of magnets 48 are further illustrated in FIGS. 6 and 7.

As also shown in the several figures, tool 10 can include an attachment ring 50 extending from one of the base ends 16 of first or second arms 12 or 14. Attachment ring 50 can be configured for allowing tool 10 to be attached to a lanyard. It is also recognized that the arms of tool 10 may be sized so as to accommodate the placement of indicia, such as logos, designs, etc., etched into and otherwise provided on various parts of tool 10 such as but not limited to the exterior sides 34 of first or second arms 12 and 14.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A multifunctional angler tool comprising:
   a first arm having a first base end and a first free end;
   a second arm having a second base end and a second free end;
   a coupling pin for coupling said first base end and said second base end together;
   a cutting blade extending from said first free end;
   a pocket defined into an exterior side of said second arm; and
   a pin positioned within said pocket, said pin extending generally longitudinally along a length of said pocket; wherein said pocket is configured for allowing an eye of a fishing hook to be inserted therein and around said pin;
   wherein said first arm and said second arm are configured for fixed pivoting rotation about said first and said second base ends to allow said first and said second free ends to move between an open position and a closed position;
   wherein said cutting blade contacts said second free end when said tool is in said closed position and a gap is positioned between said cutting blade and said second free end when said tool is in said open position;
   an elongated channel defined longitudinally into said exterior side of said second arm; and
   a fishing hook eye alignment slot defined perpendicularly into said elongated channel, said alignment slot and positioned intermediately along the length of said elongated channel;
   wherein said alignment slot is configured to receive an eye of a fishing hook with an opening extending through said eye generally aligned with said elongated channel;
   wherein said elongated channel is configured to receive a portion of a fishing line and guiding said portion of said fishing line through said opening of said eye.

2. The tool of claim 1 further comprising a magnet positioned on an interior side of said second arm and beneath said alignment slot, wherein said magnet is orientated to apply a magnetic force of attraction toward said alignment slot.

3. The tool of claim 1, wherein said magnet is configured for maintaining said eye of said fishing hook in a generally perpendicular position when inserted into said alignment slot.

4. The tool of claim 1, wherein said magnet is recessed into said interior side of said second arm.

5. The tool of claim 1 further comprising:
   an elongated channel defined longitudinally into an exterior side of said first arm; and
   a fishing hook eye alignment slot defined perpendicularly into said elongated channel, said alignment slot and positioned intermediately along the length of said elongated channel;

wherein said alignment slot is configured to receive an eye of a fishing hook with an opening extending through said eye generally aligned with said elongated channel;

wherein said elongated channel is configured to receive a portion of a fishing line and guiding said portion of said fishing line through said opening of said eye.

6. The tool of claim 1 further comprising:
a first magnet positioned on an interior side of said first arm; and
a second magnet positioned on an interior side of said second arm;
wherein said first magnet and said second magnet polarized to provide a repelling force for maintaining said tool in said open position unless said first and said second arms are pressed together.

7. The tool of claim 6, wherein said first magnet is recessed into said interior side of said first arm and said second magnet is recessed into said interior side of said second arm.

8. The tool of claim 7, wherein said first magnet and said second magnet are positioned closer to said first and said second based ends than said first and said second free ends.

9. A multifunctional angler tool comprising:
a first arm having a first base end and a first free end;
a second arm having a second base end and a second free end;
a hinged connection connecting said first and said second base ends together and allowing said first free end to be selectively moved relative to said second free end;
a cutting blade extending from said first free end;
an elongated channel defined longitudinally into an exterior side of said second al in; and
a fishing hook eye alignment slot defined substantially normal to said elongated channel, said alignment slot and positioned intermediately along the length of said elongated channel;
wherein said first arm and said second arm are configured for fixed pivoting rotation about said hinged connection to allow said first and said second free ends to move between an open position and a closed position;
wherein said cutting blade contacts said second free end when said tool is in said closed position and a gap is positioned between said cutting blade and said second free end when said tool is in said open position;

wherein said alignment slot is configured to receive an eye of a fishing hook with an opening extending through said eye generally aligned with said elongated channel;

wherein said elongated channel is configured to receive a portion of a fishing line and guiding said portion of said fishing line through said opening of said eye.

10. The tool of claim 9, wherein said second min further comprises a recessed magnet positioned on an interior side of said second arm, said recessed magnet positioned opposite said alignment slot and configured for maintaining said eye of said fishing hook in a generally perpendicular position when inserted into said alignment slot.

11. The tool of claim 9, wherein said second arm includes a magnet located proximal to said slot and being operable to hold said eye of the hook in a substantially vertical position to assist in threading said line through said eye.

12. The tool of claim 9 further comprising:
a pocket defined into an exterior side of said second arm; and
a pin positioned within said pocket, said pin extending generally longitudinally along a length of said pocket;
wherein said pocket is configured for allowing an eye of a fishing hook to be inserted therein and around said pin.

13. The tool of claim 12 further comprising:
a first crimping pocket defined into an interior side of said first arm;
a second crimping pocket defined into an interior side of said second arm, said second crimping pocket being generally aligned with said first crimping pocket;
wherein said first and said second pockets are sized to receive a lead shot when said tool is in said open position and crimp said lead shot onto a fishing line when said tool is moved to said closed position with said lead shot positioned between said first and said second crimping pockets.

14. The tool of claim 13 further comprising:
a first magnet positioned on an interior side of said first arm; and
a second magnet positioned on an interior side of said second arm;
wherein said first magnet and said second magnet polarized to provide a repelling force for maintaining said tool in said open position.

\* \* \* \* \*